United States Patent
Zidan et al.

(10) Patent No.: US 9,199,844 B2
(45) Date of Patent: Dec. 1, 2015

(54) TWO STEP NOVEL HYDROGEN SYSTEM USING ADDITIVES TO ENHANCE HYDROGEN RELEASE FROM THE HYDROLYSIS OF ALANE AND ACTIVATED ALUMINUM

(71) Applicant: Savannah River Nuclear Solutions, LLC, Aiken, SC (US)

(72) Inventors: Ragaiy Zidan, Aiken, SC (US); Joseph A Teprovich, Aiken, SC (US); Theodore Motyka, Aiken, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 10 days.

(21) Appl. No.: 14/095,033

(22) Filed: Dec. 3, 2013

(65) Prior Publication Data

US 2014/0154172 A1    Jun. 5, 2014

Related U.S. Application Data (60) Provisional application No. 61/732,478, filed on Dec. 3, 2012.

(51) Int. Cl.
*C01B 3/08* (2006.01)
*B01J 8/00* (2006.01)
*C01B 3/06* (2006.01)
*C01B 3/04* (2006.01)

(52) U.S. Cl.
CPC . *C01B 3/065* (2013.01); *C01B 3/04* (2013.01); *C01B 3/08* (2013.01)

(58) Field of Classification Search
CPC .......... Y02E 60/36; Y02E 60/324; C01B 3/08

USPC ........................................................ 423/658.2
See application file for complete search history.

(56) References Cited

U.S. PATENT DOCUMENTS

| 3,940,474 | A | * | 2/1976 | Huskins et al. ............ 423/658.2 |
| 4,308,248 | A | | 12/1981 | Anderson |
| 4,608,248 | A | * | 8/1986 | Knecht et al. ................. 424/427 |
| 6,228,338 | B1 | | 5/2001 | Petrie et al. |
| 6,506,360 | B1 | | 1/2003 | Andersen et al. |

(Continued)

FOREIGN PATENT DOCUMENTS

WO   WO 0076913   12/2000

OTHER PUBLICATIONS

Joseph A. Teprovich Jr., Theodore Motyka, Ragiay Zidan; "Hydrogen System Using Novel Additivies to Caralyze Hydrogen Release From the Hydrolysis of Alane and Activated Aluminum"; International Journal of Dyfrogen Energy 37 (2012) 1594-1603; Published by Elsevier Ltd.

(Continued)

*Primary Examiner* — Colleen Dunn
*Assistant Examiner* — Syed Iqbal
(74) *Attorney, Agent, or Firm* — Bennett Mullinax LLC (57) ABSTRACT

A system for the generation of hydrogen for use in portable power systems is set forth utilizing a two-step process that involves the thermal decomposition of $AlH_3$ (10 wt % $H_2$) followed by the hydrolysis of the activated aluminum (Al*) byproduct to release additional $H_2$. Additionally, a process in which water is added directly without prior history to the $AlH_3$:PA composite is also disclosed.

10 Claims, 5 Drawing Sheets

(56) References Cited

U.S. PATENT DOCUMENTS

| | | |
|---|---|---|
| 6,638,493 B2 | 10/2003 | Andersen et al. |
| 6,800,258 B2 | 10/2004 | Andersen et al. |
| 7,144,567 B2 | 12/2006 | Andersen et al. |
| 7,235,226 B2 | 6/2007 | Watanabe et al. |
| 7,837,976 B2 | 11/2010 | Sandrock et al. |
| 2010/0068129 A1 | 3/2010 | Hauback |
| 2010/0173225 A1* | 7/2010 | Rosenband et al. ......... 429/502 |

OTHER PUBLICATIONS

John Petrovic and George Thomas; "Reaction of Aluminum With Water to Produce Hyddrogen"; US Department of Energy; Version 1.0, 2008; pp. 1-26.

* cited by examiner

TWO STEP NOVEL HYDROGEN SYSTEM USING ADDITIVES TO ENHANCE HYDROGEN RELEASE FROM THE HYDROLYSIS OF ALANE AND ACTIVATED ALUMINUM

RELATED APPLICATIONS

This application claims the benefit of U.S. Provisional Application No. 61/732,478 filed on Dec. 3, 2012 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

BACKGROUND OF THE INVENTION

Proton Exchange Membrane (PEM) fuel cells offer a means to generate power with zero carbon emissions and high efficiency. Extensive research has shown that metal hydrides (MHx) can provide a safe, reliable, and pure supply of hydrogen for a PEM fuel cell versus compressed or cryogenic hydrogen. In these systems, the metal hydride component is considered a "one-time-use" material and is not rehydrogenated due to unfavorable rehydrogenation kinetics. This type of system is not currently practical for large scale automotive applications; however, it is ideal for portable power applications such as military use and use by emergency responders.

Sodium borohydride ($NaBH_4$) has been studied extensively as a hydrogen source for portable power systems due to its high theoretical hydrogen content.

$$NaBH + 2H_2O \rightarrow NaBO_2 + 4H_2; 10.8 \text{ wt \%} \quad (1)$$

However, an $NaBH_4$ based system has a disadvantage of not releasing all the hydrogen due to the formation of hydroxide layer around the NaBH4 particles.

The release of hydrogen from $NaBH_4$ proceeds through an aqueous process that utilizes heat and a transition metal catalyst (Ti, Co, or Ru based) for the hydrolysis reaction to occur. The use of water in the aqueous process reduces the available hydrogen for applications to only five percent. Other work has shown that the methanolysis of $NaBH_4$ is another possible route for hydrogen release. The use of methanol also allows for the system to operate at sub-zero temperatures if necessary, but also requires the use of a transition metal catalyst. Typical experimental conditions for the $NaBH_4$ systems include a large excess of water due to the poor solubility of the $NaBO_2$ hydrolysis product in water (28 g/100 g water) and limits the starting concentration of $NaBH_4$ to below 16 g/100 g of $H_2O$. Also, the calculation of the $H_2$ capacity is often based on the identity of the hydrolysis product (i.e. $NaBO_2 \cdot 4H_2O$, 7.3 wt % $H_2$; $NaBO_2 \cdot 6H_2O$, 5.5 wt % $H_2$) recovered from solution after the hydrolysis reaction and does not account for the large excess of water (or methanol) needed for the reaction to occur. Aluminum hydride ($AlH_3$), while not a new material has only in the last few years been notably considered as a hydrogen storage material for fuel cell applications due to its high volumetric and gravimetric hydrogen capacities (148 g/L and 10.1 wt % respectively) as well as its favorable desorption kinetics. There are many polymorphs of $AlH_3$ ($\alpha, \alpha', \beta, \delta, \epsilon, \gamma, \zeta$), however, the most studied has been the $\alpha$ polymorph due to its stability and will be the focus of this study. A major drawback to the use of this material is that rehydrogenation of aluminum requires in excess of 105 bar $H_2$ and is currently impractical for automotive applications.

Accordingly, there remains room for improvement and variation in the art.

SUMMARY OF THE INVENTION

It is one aspect of at least one of the present embodiments to provide a process of generating hydrogen comprising the steps of:

providing a source of $AlH_3$, heating the $AlH_3$ to a temperature of at least about 150° and more preferably to a temperature of between about 185° C. and about 200° C., thereby forming a reaction products consisting of a fast hydrogen gas and activated aluminum; adding a promoter to the activated aluminum reaction product, the promoter being selected from the group consisting of $NaAlH_4$, $NaH$, and $NaOH$ to provide a composite material; and, adding a stoichiometric amount of water to the composite material, thereby generating a second hydrogen gas source.

It is a further aspect of at least one embodiment of the present invention to provide a process of providing hydrogen comprising the steps of:

providing a source of $AlH_3$; adding a promoter to the $AlH_3$, the promoter selected from the group consisting of $NaAlH_4$, $NaH$, and $NaOH$ and combination thereof to provide a composite material; and adding water to the composite material, thereby generating a hydrogen gas reaction product.

It is a further aspect of at least one embodiment of the present invention to provide a process where the step of adding a stoichiometric amount of water further provides increasing the amount of water to twice the stoichiometric amount.

It is a further aspect of at least one embodiment of the present invention to provide a process wherein step of heating the $AlH_3$ uses heat generated from a thermolysis of an $AlH_3$ containing composite material.

The process of adding a promoter to activated aluminum removes an oxide layer present of the surface of the activated aluminum. The process of adding the promoter material to the $AlH_3$ may also remove a polymeric coating on the surface of the $AlH_3$.

The process forms an activated aluminum that has a particle size and shape similar to the $AlH_3$ material but has a greater surface area following the heating step of $AlH_3$.

The process allows between about 3.3 weight % to about 3.6 weight % of hydrogen to be released from the composite and water combination. Accordingly, the composite material releases about between 10.0 weight % to about 10.6 weight % relative to the dry weight of the composite material.

The process and materials described provide for a system for the generation of hydrogen for use in portable power systems utilizing a two-step process that involves the thermal decomposition of $AlH_3$ (10 wt % $H_2$) followed by the hydrolysis of the activated aluminum (Al*) byproduct to release additional $H_2$. This process uses promoter additives (PA) to catalyze the hydrolysis of Al*. Results have shown that the addition of water to Al*:PA composite results in an instantaneous release of hydrogen at room temperature, without the use of transition metal catalysts. This secondary reaction increases the overall hydrogen content of the material even when the weight of the added water is accounted for.

Additionally, a one-step process in which water is added directly to the $AlH_3$:PA composite is also disclosed. Large amounts of $H_2$ and heat are released immediately following the addition of water and may serve a means to shorten the start-up time of the fuel cell as well as assist in the thermal decomposition of $AlH_3$. Data provided compares the use of different PA's and presents novel composites made of $AlH_3$ and ionic hydride additives optimize performance of a hydrogen source based on $AlH_3$. The composites were characterized by TGA-RGA, XRD, and SEM before and after $H_2$ release.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF A PREFERRED EMBODIMENT

Reference will now be made in, detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it, is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Details on the preferred embodiment, operating conditions, data obtained, and figures relative to this invention can be found in reference to the Publication entitled *Hydrogen system using novel additives to catalyze hydrogen release from the hydrolysis of alane and activated aluminum* in the International Journal of Hydrogen Energy 37, (2012) 1594-1603 in which is incorporated herein by reference in its entirety. High capacity materials like $AlH_3$ can be a viable source of hydrogen for small portable power applications utilizing PEM fuels cells. Upon the thermal dehydrogenation of $\alpha$-$AlH_3$, pure activated aluminum (Al*) is the only solid byproduct and is highly reactive with water due to its small particle size (micron scale) as well as the absence of a surface oxide layer. The hydrolysis reaction of aluminum has also received considerable attention as an on board hydrogen source for PEM fuel cells. The theoretical capacity of hydrogen released from hydrolysis of aluminum is 11 wt % relative to the amount of metal used, however, the capacity of this system is reduced to only 3.7 wt % when the amount of water used for the hydrolysis reaction is accounted for $2Al^* + 6H_2O_2 \rightarrow Al(OH)_3 + 3H_2$ (2).

The hydrolysis of aluminum occurs slowly at room temperature due to the formation of an oxide layer on the surface of the aluminum, preventing the complete hydrolysis of the metal. Typically, the hydrolysis of aluminum requires the use of elevated temperatures as well as the use of promoters/additives to dissolve the oxide layer on the aluminum and allow the reaction to continue. The promoter additives used in known processes include oxide promoters ($TiO_2$, $Al_2O_3$ $Bi_2O$, CuO), salt promoters (NaCl, KCl), and alloying with different metal(s) (Ga, Sn, Li, Fe, Hg, Zn, In and Si).

The present process utilizes a two-step release of $H_2$. The first step is the thermal decomposition of $\alpha$-$AlH_3$ followed by the second step which is the hydrolysis of the activated aluminum (Al*) byproduct in the presence of sodium based promoter additives (NaOH, $NaAlH_4$, and NaH) at various mol %. Data indicates that $NaAlH_4$ and NaH are superior to commonly used strong bases (i.e. NaOH) for the hydrolysis of Al* due to the fact that they provide, an additional source of $H_2$ as well as additional heat to promote the reaction. Additionally, water was added directly to the $\alpha$-$AlH_3$:PA composite resulting in the rapid release of $H_2$. The benefits and drawbacks of various embodiments are discussed below.

Each composite examined has two $H_2$ wt % values. One value includes the weight of the added water in the $H_2$ wt % calculation while the other includes only the dry weight of the composite. The later calculation will always give a higher wt % $H_2$ which is important if the system is operated in an aquatic or marine environment where water is abundant in the surroundings and does not need to be carried "on board".

Chemicals used were as provided by the supplier and are listed by supplier as follows. ATK: α-AlH3. Sigma-Aldrich: $NaAlH_4$, NaH, and NaOH. Activated aluminum (Al*) was obtained by the thermal decomposition of α-$AlH_3$ at 200° C. to ensure all $H_2$ was released from the material. Deionized water was used after it was degassed and purged with Ar. Samples were prepared by mixing the additive with either Al or α-$AlH_3$ by hand for ~1 min in a vial in an Ar filled glovebox. All experiments were performed at room temperature with no external heating source. The water addition experiments were performed using ~75 mg sample that was first placed into an open 3 mL vial. This vial containing the sample were then sealed in a glass container (~200 $cm_2$) with the lid having a rubber septum and two vent valves, one for Ar purge and the other for $H_2$ desorption. The vent valves were ground glass fittings with ~1 mm diameter holes.

The amount of $H_2$ released was quantified by measuring water displacement from an inverted graduated cylinder that was connected to one of the vent valves on the glass container with Tygon® tubing. The tubing was partially submerged in the water reservoir containing the inverted graduated cylinder. Water was added to the composites using a microliter syringe, in 2-3 equal portions in order to minimize the amount of heat generated, via the rubber septum port in the lid. A thermocouple measured the powder temperature. During the addition of water in the experiments, the temperature of the loose sample powder typically exceeded 110° C. due to this exothermic process when water was added. Most of the water vapor generated condenses in the 3 mL vial containing the sample and would react with the remaining composite material. Any water vapor that did not condense in the 3 mL vial during the process was condensed on the lid of the container in order to eliminate errors in the measurement of $H_2$ released from the sample.

For TGA-RGA experiments, a Perkin Elmer Thermogravimetric Analyzer-Pyris 1 TGA was used. The sample was heated from 30 to 250° C. at heating rate of 5° C./min, with a sample size of ~5 mg. The gas released during the heating process was identified by a Hiden Analytical RGA.

X-ray powder diffraction (XRD) was used to characterize the products using Cu-K radiation, and the samples were protected with a Kapton™ film. The Kapton™ film is the source of the broad amorphous peak at 2θ less than 25 degrees.

SEM analysis was performed on a Hitachi TM3000, operated at 15 kV, using a four-quadrant backscatter electron detector.

Figure 1:
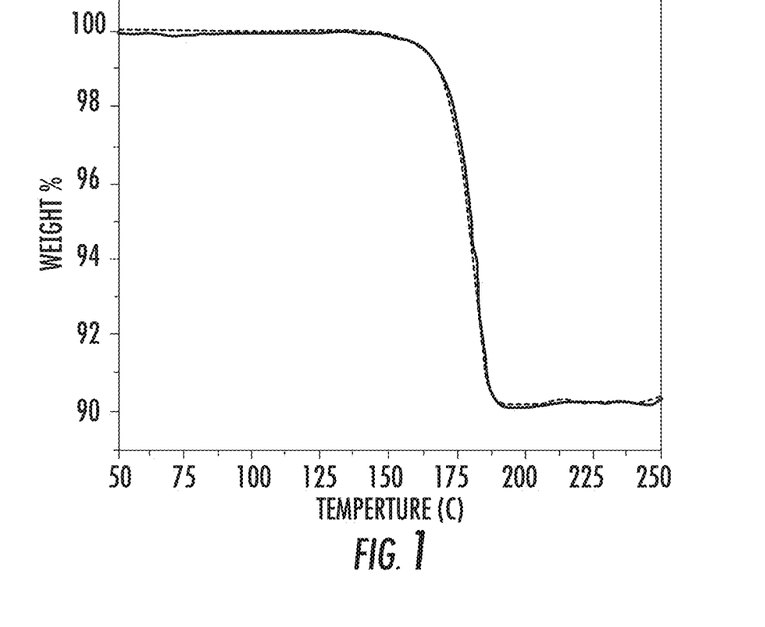
FIG. 1 is a TGA of $\alpha$-$AlH_3$ before (solid) and after exposure to air for 24 h (dotted line). Heating rate is 5° C./min.

Results and Discussion:

The α-AlH3 and the resulting activated aluminum (Al*) byproduct were characterized in order to determine the effect that the dehydrogenation and water addition had on the material in the presence and absence of the promoter additives (PA). TGA-RGA analysis of the as received α-$AlH_3$ material confirmed that the material contained 10 wt % $H_2$ with no other volatile species detected (FIG. 1). The onset of $H_2$ desorption occurs at ~150° C. and is completed by 185° C. The stability of $AlH_3$ in air was also examined and showed that the $H_2$ capacity as well as the onset of desorption was unaffected by exposure of the material to air for a 24 h period. Also, the α-AlH3 did not spontaneously decompose when water was added directly to the material. This indicates that either a polymeric additive or thin oxide coating (washing with dilute HCl) was applied to the freshly synthesized α-$AlH_3$ crystals and cause the observed stability in air and water.

Figure 2:
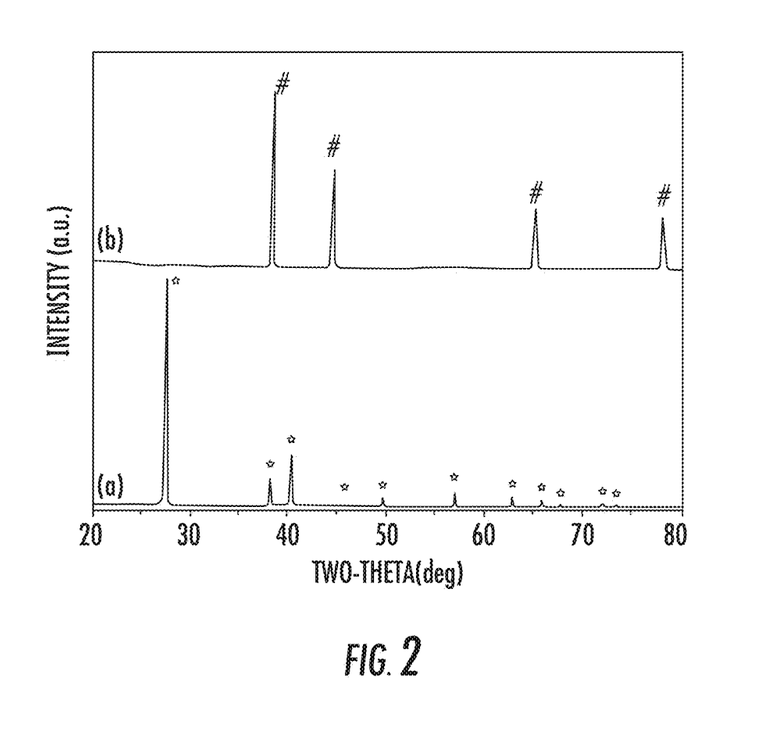
FIG. 2(a) is a XRD of $\alpha$-$AlH_3$ ([*], pdf-00-023-0761) and its decomposition product.
FIG. 2(b) is a XRD of aluminum ([#], pdf-04-005-9305).
Figure 3A:
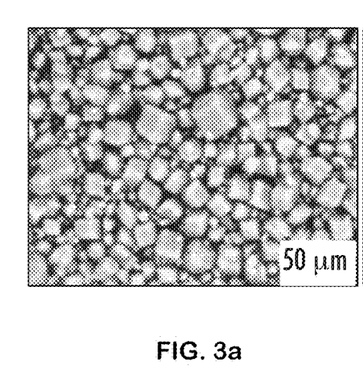
FIG. 3(a) and FIG. 3(b) are SEM images of $\alpha$-$AlH_3$ (3a) and the resulting Al* (3b) after dehydrogenation at 200° C.
Figure 3B:
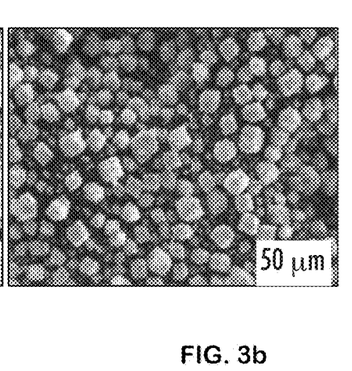

XRD analysis confirmed the presence of pure α-$AlH_3$ as shown in FIG. 2. After heating the sample to 200° C., only pure activated aluminum (Al*) remained. EM was also used to examine the changes in the material after thermal dehydrogenation of α-$AlH_3$ (FIG. 3). α-$AlH_3$ appears as smooth cubic shape crystals with an average particle size of ~20 mm. The Al* still retains the cubic shape and size of the α-$AlH_3$ precursor, however, the surface is rough and cracked due to the release of $H_2$ from within the crystal. The images show that using α-$AlH_3$ as the source of Al* is an effective way to create a high surface area material with many defects which results in its high reactivity with water. Previous work has shown that extensive ball-milling or hot-rolling is an effective way to increase surface area and/or reactivity of the Al* with water. The images show that we are able to create average particle sizes that are comparable to those produced by mechanical milling and that α-$AlH_3$ is an excellent source of Al*.

Hydrolysis of Al* in the presence of promoter additives (PA)

Figure 4:
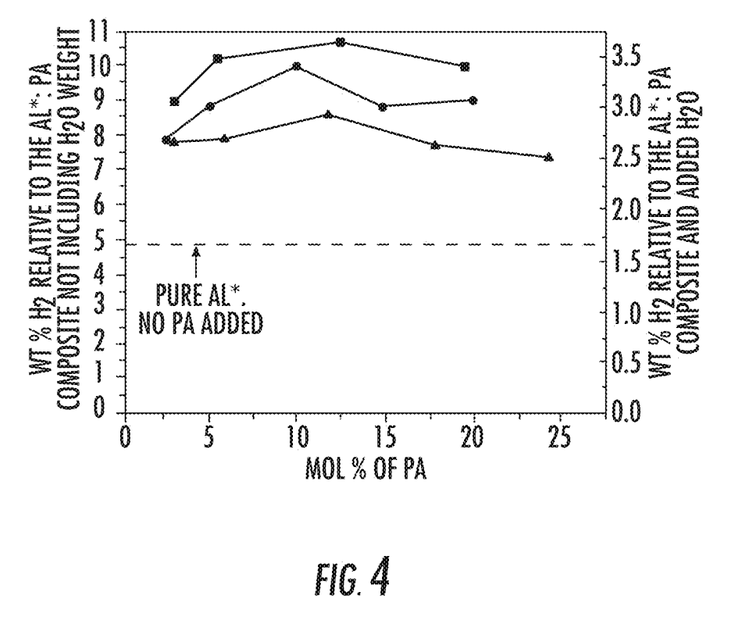
FIG. 4 is a plot of wt % of $H_2$ released from the composite (Al*:PA) vs. Mol % of the promoter additive relative to the Al*:PA composite.

Table 1 and FIG. 4 summarize the results of the water addition study in which water is added to the Al*:PA composite. These experiments simulate an operating scenario in which the α-$AlH_3$ is first thermally desorbed leaving the Al* byproduct and the PA. Initially the addition of water to Al* was tested without any additives in order to determine the effect of the PA. The addition of water to pure Al* released 1.6 wt % $H_2$ including the weight of water and starting amount of Al* (4.9 wt % when the mass of water is not accounted for). These values are well below the theoretical wt % of $H_2$ for the addition of water to Al* (3.7 wt % and 11 wt % respectively).

Additionally, the effect of the promoter additives (NaOH, NaH, and $NaAlH_4$) on the decomposition of Al* upon water addition was examined. In all cases the addition of the promoter additive increased the amount of Al* hydrolysis (Table 1 and FIG. 4). The wt % $H_2$ released from the composite has been calculated when the weight of added water is not accounted for (left axis) and when the weight of the added water is included in the final wt % $H_2$ desorbed (right axis). Each sample was approximately 75 mg and had 150 mL of $H_2O$ added to it. (■) $NaAlH_4$, (●) NaH, and (▲) NaOH. Including the amount of water added to the composite, up to 3.6 wt %, 3.3 wt %, and 2.9 wt % $H_2$ was released from the composites containing $NaAlH_4$ (12.2 mol %), NaH (10.9 mol %), and NaOH (11.6 mol %) respectively when a stoichiometric amount of water was added to the sample. If the weight of the added water is not accounted for, the wt % $H_2$ released from the dry material increases to 10.6 wt % ($NaAlH_4$), 10.0 wt % (NaH), and 8.6 wt % (NaOH) using the same molar ratios. The ability of these composites to effectively utilize a stoichiometric amount of water will significantly decrease the overall size of the system because previous systems typically utilize at least a 10-fold stoichiometric excess of water.

Also, it is important to note that the amount of foaming observed during the hydrolysis of Al* in the presence of the PA's was minimal relative to the amount of foaming observed during the hydrolysis of the pure Al* sample. This test simulates a two-step operating scenario in which the α-$AlH_3$ was already thermally dehydrogenated to yield Al* and that the amount of $H_2$ generated during the hydrolysis step is in addition to the thermally produced $H_2$ in the first step. Accordingly the optimal ratio of Al*:PA might not be ideal for the full two-step operating scenario (1. thermal dehydrogenation, 2. hydrolysis) because an increase in the amount of PA reduces the amount of the high capacity α-$AlH_3$ as well as the amount of Al* available for hydrolysis in the second step. As a result, it will be easier to compare the performance of each ratio based on the quantity of $H_2$ released per gram of dry material when the $H_2$ contribution from both steps is taken into account. This will allow for the determination of the optimal starting ratio of α-AlH3:PA for the two-step operating scenario.

The results of these experiments are summarized in Table 2. While the NaH generated the highest volume of $H_2$ at 10.7 mol %, the $NaAlH_4$ and NaOH PA's generated the highest volume of $H_2$ at lower mol %'s (5.8 and 2.8 respectively). These results also show that the volume of $H_2$ released from the $NaAlH_4$ and NaH composites at their optimal ratios is virtually identical when the amount of $H_2$ released during both desorption steps are accounted for. This is due to the fact that more $H_2$ is released during the thermal decomposition of α-$AlH_3$ in the case of NaH, while more $H_2$ is released during the hydrolysis reaction in the presence of $NaAlH_4$.

Additional experiments have demonstrated that the complete reaction of Al* with water does occur when a large excess of water of ~2 times the stoichiometric amount of $H_2O$ required, based on Eq. (2), is added to the composite when $NaAlH_4$ and NaH are used as the PA. However, if the amount of water is accounted for in these experiments, the overall capacity of the system is significantly decreased. The increase in Al* hydrolysis in the presence of $NaAlH_4$ and NaH is likely due to the highly exothermic reaction that occurs upon the addition of water to these two compounds. This additional heat added to the system further enhances the hydrolysis of Al* when compared to the more commonly utilized NaOH which shows improved kinetics at elevated temperatures.

Figure 5:
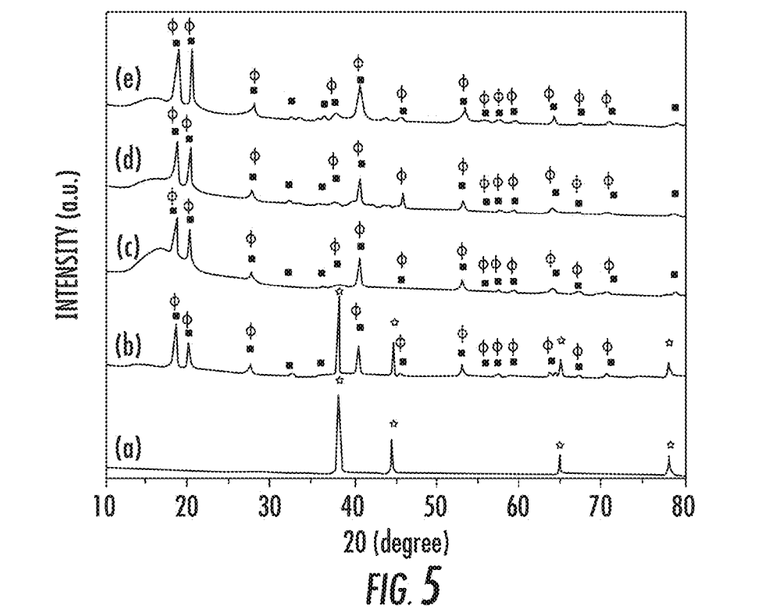
FIG. 5 is a XRD comparison after water addition to the Al*:PA composites. (a) Pure Al*, (b) pure Al*+$H_2O$, (c) Al*+$NaAlH_4$+$H_2O$, (d) Ar+NaH+$H_2O$, (e) Al*+NaOH+$H_2O$. (*) aluminum, Al*, 04-005-9305; (■) aluminum oxide hydroxide, $Al_2O_3 \cdot 3H_2O$, 00-001-0307; ($\phi$) bayerite, $Al(OH)_3$, 04-014-1754.

XRD analysis after the hydrolysis of pure Al* as well as in the presence of PA was also performed (FIG. 5). For the hydrolysis of pure activated aluminum, bayerite ($Al(OH)_3$) and aluminum oxide hydrate ($Al_2O_3.3H_2O$) were the two main hydrolysis products along with unreacted Al*. Additives are needed to dissolve the coherent and adherent oxide layer on the surface of the aluminum which otherwise prevents the hydrolysis from proceeding. In the presence of the additives and excess of water, there is no unreacted Al* left in the sample and only the bayerite and aluminum oxide hydrate hydrolysis products were detected. This demonstrates that the additives were effective at removing the thin oxide layer on the surface of the aluminum.

Figure 6:
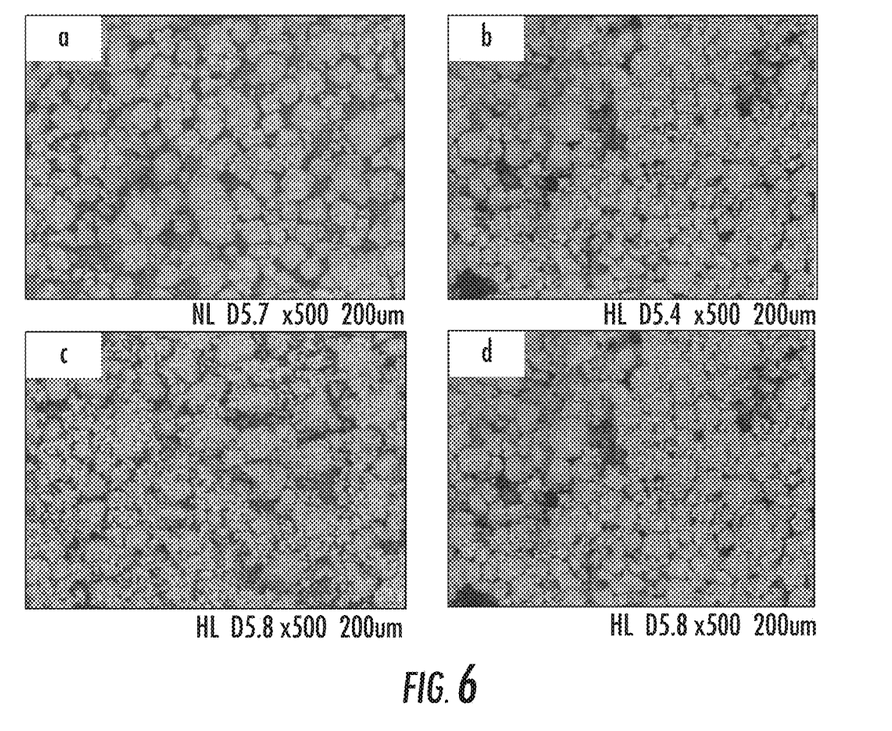
FIGS. 6(a)-6(d) are SEM image comparison after water addition to the Al:PA composites. 6a.) pure Al*, no additive, 6b.) Al*+NaOH, 6c.) Al* +$NaAlH_4$, and 6d.) Al*+NaH.

SEM imaging was also used to determine the effect that the promoter additives had on the hydrolysis of Al* upon the addition of excess water and highlights the effectiveness of the PA and explains some of the observed differences in $H_2$ capacity of the composites (FIG. 6). The formation of smaller particles is observed as the product of the reaction of Al* with water, however, the cubic structure of Al* is mostly retained with only minor differences in shape when compared to the unreacted Al*. When water is added to the material in the presence of NaOH, there is a noticeable reduction in particle size of the product and indicates that more of the Al* reacted with the water. When the hydrolysis of Al* is performed in the presence of NaH and $NaAlH_4$, the size of the product particles is reduced significantly when compared the hydrolysis products of pure Al* or in the presence of NaOH. This is consistent with the observed increase in $H_2$ capacity of the composite in the presence of the two metal hydride promoters when compared to NaOH or pure Al*. The SEM images further validates the superior nature of NaH and $NaAlH_4$ as promoter additives for Al* hydrolysis over the commonly used alkaline hydroxides (i.e. NaOH). Hydrolysis of α-$AlH_3$ in the presence of promoter additives (PA) This operating scenario examines how the promoter additives are able to facilitate the decomposition of α-$AlH_3$ upon the addition of water when no external heat source is provided.

Figure 7:
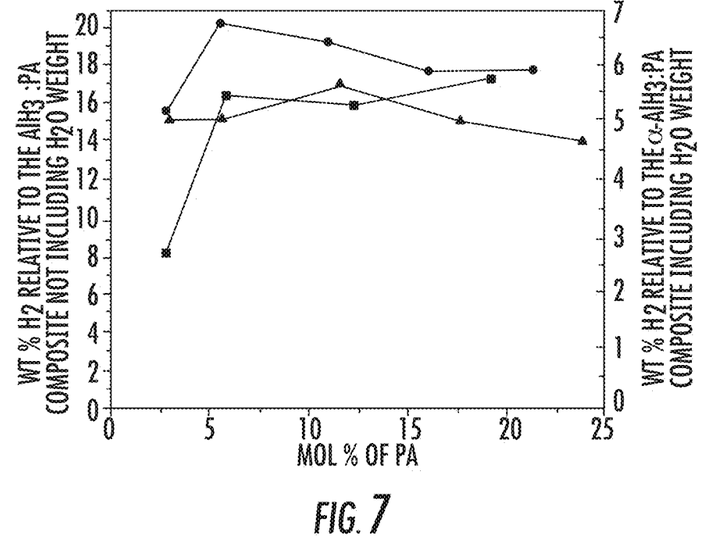
FIG. 7 is a plot of wt % of $H_2$ released from the composite ($\alpha$-$AlH_3$:PA) vs. Mol % of the promoter additive relative to the $AlH_3$:PA composite.

As described above, the α-$AlH_3$ utilized in this study does not react or decompose when exposed to water and is likely due to the presence of a polymeric coating or extremely thin oxide layer on the surface of the cubic crystals. Table 3 and FIG. 7 summary the result for the addition of water to the α-$AlH_3$:PA composites. The wt % $H_2$ released from the composite has been calculated when the weight of added water is not accounted for (left axis) and when the weight of the added water is included in the final wt % $H_2$ desorbed (right axis). Each sample was approximately 75 mg and had 150 mL of $H_2O$ added to it. (■) $NaAlH_4$, (●)NaH, and (▲) NaOH.

All three of the PA tested were able to promote the hydrolysis of α-$AlH_3$ upon water addition as well as the resulting Al* and the $H_2$ content of the PA to instantaneously release large quantities of $H_2$. In this study the most effective promoter additive was NaH when it was added at 5.5 wt % (4.44 mol %) of the α-$AlH_3$:NaH composite. This composite instantaneously released 6.8 wt % $H_2$ vs. the composite when the amount of water added was accounted for (20.2 wt % $H_2$ when the amount of water added is not accounted for). The wt % $H_2$ desorbed from the composite is higher than what is regarded as the state of the art system for the hydrolysis of $NaBH_4$ which is ~4 wt % $H_2$. An analysis of the volume of $H_2$ released from the system showed that this one-step operating scenario releases a higher volume of H when compared to the two-step desorption system (Table 4).

Figure 8:
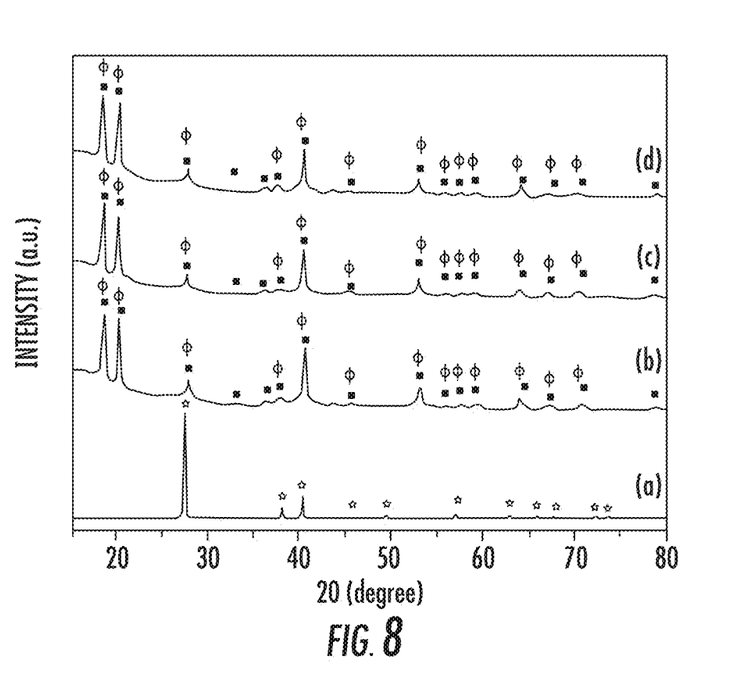
FIG. 8 is a XRD comparison after water addition to the $AlH_3$:PA composites. (a) pure $AlH_3$, (b) $AlH_3$+$NaAlH_4$+H2O, (c) $AlH_3$+NaH+$H_2O$, (d) $AlH_3$+NaOH+$H_2O$. (*)$AlH_3$ 00-023-0761; (■) aluminum oxide hydroxide, $Al_2O_3 \cdot 3H_2O$, 00-001-0307; ($\phi$) bayerite, $Al(OH)_3$, 04-014-1754.
Figure 9:
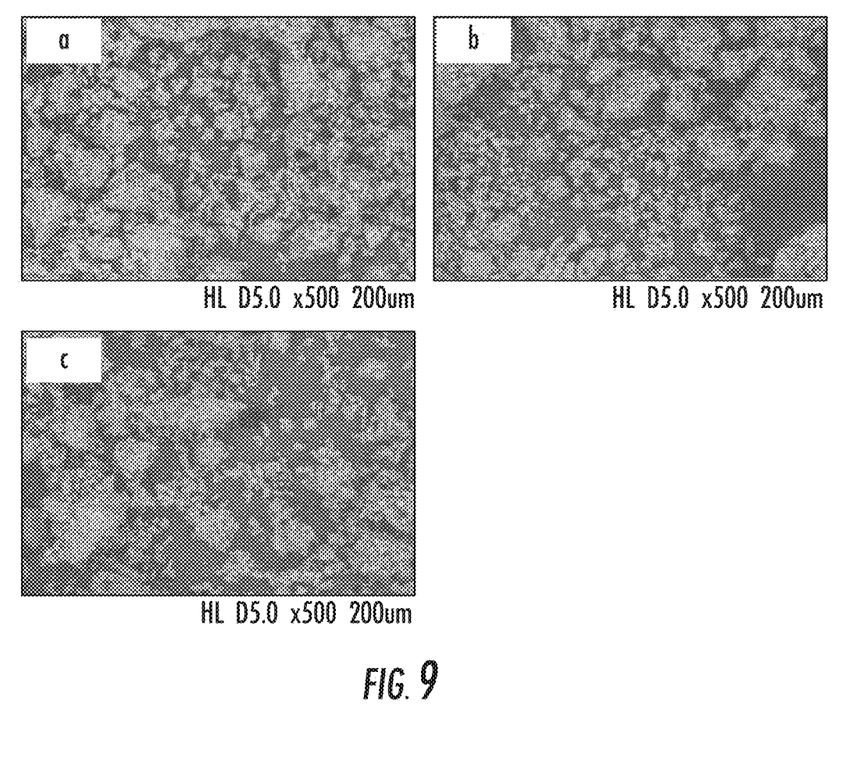
FIGS. 9a-9c are SEM image comparison after water addition to the $\alpha$-$AlH_3$:PA composites. 9a.) $\alpha$-$AlH_3$+NaOH, 9b.) $\alpha$-$AlH_3$+$NaAlH_4$, and 9c.) $\alpha$-$AlH_3$+NaH.

XRD analysis (FIG. 8) confirmed the complete decomposition of the a-$AlH_3$ and that the hydrolysis products were the same as observed for the additives with Al* (Bayerite and aluminum oxide hydrate). This is consistent with the decomposition of α-$AlH_3$ to Al* followed by the hydrolysis of the Al* in the presence of the PA. SEM (FIG. 9) also confirmed the complete decomposition of the cubic α-$AlH_3$. The particle size was significantly reduced and the material became amorphous with multiple cracks and fractures. The smaller particle size of the material after the one-step operating scenario when compared to the two-step operating scenario is also consistent with the higher volume of $H_2$ release. Analysis of the two different operating scenarios:

Scenario 1: Step #1—Heat $AlH_3$ and additive to release the $H_2$ from α-$AlH_3$ to generate Al*. Step #2—Add $H_2O$ to the Alt and PA to release additional $H_2$.

Advantage: Very high capacity system which can easily regulate the release of $H_2$ during step #1.

Disadvantage: When the weight of the heater and its, components is accounted for, the overall $H_2$ weight capacity of the system will be decreased. The system will have a long initiation time since the composite must first be heated to ~150° C. to release $H_2$ from α-$AlH_3$.

Scenario 2:

$H_2O$ can be added directly to the α-$AlH_3$+PA to release $H_2$.

Advantage: Does not require the additional weight of heater and components needed for its operation. $H_2$ release is instantaneous upon the addition of water.

Disadvantage: Could be difficult to control and prevent a runaway reaction in which large quantities of $H_2$ (and heat) is released upon the addition of water.

Since the reactants used in these reactions are based on metal hydrides (consisting of only metals and hydrogen) no contaminants will accompany the released hydrogen. However, the exothermic hydrolysis reaction described in this system also produces a small amount of water vapor which is advantageous for PEM fuel cell operation because it operates under a humid environment. If the amount of water vapor released during this process exceeds the optimal humid conditions of the practical fuel cell, it can be condensed and reused for the hydrolysis reaction in addition to the waste $H_2O$ generated by the operation of the fuel cell. Also, it may be possible to use both operating scenarios in tandem in which the water is initially added directly to the $\alpha$-$AlH_3$PA composite to produce enough $H_2$ to start the fuel cell. Then using the heat generated by the fuel cell to start the thermal decomposition of the $\alpha$-$AlH_3$. This will reduce the induction period (start-up time) typically required for a system utilizing a fuel cell.

Conclusion

The hydrolysis of Al* as well as polymerically or oxide stabilized $\alpha$-$AlH_3$ will readily occur in the presence of promoter additives (NaOH, $NaAlH_4$, and NaH) to rapidly release large quantities of $H_2$ at room temperature even when a stoichiometric amount of water is added to the composite ($2Al^* + 6H_2O \rightarrow 2Al(OH)_3$ $3H_2$). This is in sharp contrast to previous studies of aluminum hydrolysis which typically uses a large stoichiometric excess (>10) of water, elevated temperatures, and transition metal catalysts. The PA provides an alkaline environment to remove the oxide layer on Al* (or polymeric coating for $\alpha$-AlN in order to allow the reaction to propagate. The use of $NaAlH_4$ and NaH as PAs are far superior to the commonly used alkaline hydroxide PAs (i.e. NaOH) and is due to the large amount of heat released upon their hydrolysis as well as their inherent $H_2$ content. This system is ideal for operation in environments where an external water supply is readily available. The $\alpha$-$AlH_3$:PA composites can provide a reliable $H_2$ supply for mobile applications.

TABLE 1

SUMMARY OF WATER ADDITION TO AL*:PA COMPOSITES OF VARIOUS RATIOS

| ADDITIVE (AL* + PA) | WT % PA IN COMPOSITE | MOL % PA IN COMPOSITE | WT % $H_2$ FROM PA IN COMPOSITE | WT % $H_2$ vs. COMPOSITE (NOT INCLUDING ADDED $H_2O$) | WT % $H_2$ vs. COMPOSITE (INCLUDING ADDED $H_2O$) |
|---|---|---|---|---|---|
| NONE | 0 | 0 | 0 | 4.9 | 1.6 |
| $NaAlH_4$ | 5.5 | 2.8 | 0.34 | 8.9 | 3.0 |
| | 11.0 | 5.2 | 0.63 | 10.2 | 3.4 |
| | 21.7 | 12.2 | 1.08 | 10.6 | 3.6 |
| | 32.2 | 19.3 | 1.43 | 10 | 3.3 |
| NaH | 2.4 | 2.7 | 0.1 | 7.8 | 2.6 |
| | 4.9 | 5.4 | 0.2 | 8.8 | 2.9 |
| | 9.8 | 10.9 | 0.41 | 10.0 | 3.3 |
| | 14.6 | 16.2 | 0.61 | 8.8 | 3.0 |
| | 19.8 | 21.8 | 0.83 | 9.0 | 3.0 |
| NaOH | 4.1 | 2.8 | — | 7.7 | 2.6 |
| | 8.2 | 5.7 | — | 7.9 | 2.7 |
| | 16.2 | 11.6 | — | 8.6 | 2.9 |
| | 24 | 17.6 | — | 7.7 | 2.6 |
| | 32 | 24.1 | — | 7.4 | 2.5 |

TABLE 2

VOLUME OF $H_2$ RELEASED PER GRAM OF STARTING COMPOSITE DURING THE TWO-STEP OPERATING SCENARIO. THE WEIGTH OF ADDED WATER IS NOT ACCOUNTED FOR IN THESE CALCULATIONS.

| ADDITIVE ($\alpha$-$AlH_3$ + PA) | WT % PA IN COMPOSITE | MOL % PA IN COMPOSITE | VOLUME (ml) of $H_2$ PER GRAM OF COMPOSITE (STEP 1) | VOLUME (ml) of $H_2$ PER GRAM OF COMPOSITE (STEP 2) | VOLUME (ml) of $H_2$ PER GRAM OF COMPOSITE (TOTAL) |
|---|---|---|---|---|---|
| NONE | 0 | 0 | 1210 | 500 | 1710 |
| $NaAlH_4$ | 5 | 2.8 | 1149 | 974 | 2123 |
| | 10 | 5.8 | 1088 | 1123 | 2211 |
| | 20 | 12.2 | 967 | 1180 | 2147 |
| | 30 | 19.2 | 856 | 1125 | 1971 |
| NaH | 2.2 | 2.7 | 1183 | 851 | 2034 |
| | 4.4 | 5.4 | 1156 | 963 | 2119 |
| | 8.8 | 10.7 | 1103 | 1099 | 2202 |
| | 13.2 | 16.0 | 1050 | 972 | 2021 |
| | 17.8 | 21.3 | 994 | 1000 | 1994 |
| NaOH | 3.7 | 2.8 | 1165 | 842 | 2007 |
| | 7.4 | 5.6 | 1120 | 867 | 1987 |
| | 14.8 | 11.5 | 1030 | 952 | 1982 |
| | 22.2 | 17.6 | 941 | 859 | 1800 |
| | 29.6 | 24.0 | 851 | 832 | 1683 |

TABLE 3

SUMMARY OF WATER ADDITION TO α-AlH$_3$:PA COMPOSITES OF VARIOUS RATIOS

| ADDITIVE (α-AlH$_3$ + PA) | WT % PA IN COMPOSITE | MOL % PA IN COMPOSITE | WT % H$_2$ FROM PA IN COMPOSITE | WT % H$_2$ vs. COMPOSITE (NOT INCLUDING ADDED H$_2$O) | WT % H$_2$ vs. COMPOSITE (INCLUDING ADDED H$_2$O) |
|---|---|---|---|---|---|
| NaAlH$_4$ | 5 | 2.8 | 0.37 | 8.2 | 2.8 |
| | 10 | 5.8 | 0.74 | 16.3 | 5.4 |
| | 20 | 12.2 | 1.48 | 15.7 | 5.3 |
| | 30 | 19.2 | 2.22 | 17.1 | 5.7 |
| NaH | 2.2 | 2.7 | 0.16 | 15.4 | 5.1 |
| | 4.4 | 5.5 | 0.32 | 20.2 | 6.8 |
| | 8.8 | 10.9 | 0.65 | 19.2 | 6.4 |
| | 13.2 | 15.9 | 0.98 | 17.5 | 5.8 |
| | 21.3 | 21.3 | 1.32 | 17.5 | 5.9 |
| NaOH | 3.7 | 2.8 | — | 14.9 | 5.1 |
| | 7.4 | 5.6 | — | 15.0 | 5.1 |
| | 14.8 | 11.5 | — | 16.7 | 5.6 |
| | 22.2 | 17.6 | — | 14.9 | 5.1 |
| | 29.6 | 24.0 | — | 13.7 | 4.6 |

TABLE 4

VOLUME OF H$_2$ RELEASED PER GRAM OF STARTING COMPOSITE DURING THE ONE-STEP OPERATING SCENARIO. THE WEIGHT OF ADDED WATER IS NOT ACCOUNTED FOR IN THESE CALCULATIONS.

| ADDITIVE (α-AlH$_3$ + PA) | WT % PA IN COMPOSITE | MOL % PA IN COMPOSITE | VOLUME (ml) H$_2$ PER GRAM OF COMPOSITE |
|---|---|---|---|
| NaAlH$_4$ | 5 | 2.8 | 996 |
| | 10 | 5.8 | 1977 |
| | 20 | 12.2 | 1898 |
| | 30 | 19.2 | 2072 |
| NaH | 2.2 | 2.7 | 1860 |
| | 4.4 | 5.5 | 2444 |
| | 8.8 | 10.9 | 2321 |
| | 13.2 | 15.9 | 2116 |
| | 21.3 | 21.3 | 2126 |
| NaOH | 3.7 | 2.8 | 1798 |
| | 7.4 | 5.6 | 1818 |
| | 14.8 | 11.5 | 2025 |
| | 22.2 | 17.6 | 1803 |
| | 29.6 | 24.0 | 1658 |

The following references set forth below are incorporated herein by reference as if set forth in their entirety.

[1] Demirci U B, Akdim O, Miele P. Ten-years efforts and a no-go recommendation for sodium borohydride for on-board automotive hydrogen storage. Int J Hydrogen Energy 2009; 34: 2638-45.

[2] Amendola S C, Sharp-Goldman S L, Janjua M S, Kelly M T, Petillo P J, Binder M. An ultrasafe hydrogen generator: aqueous, alaline borohydride solutions and Ru catalyst. J Power Sources 2000; 85.

[3] Cakanyildirim C, Guru M. Hydrogen cycle with sodium borohydride. Int J Hydrogen Energy 2008; 33.

[4] Gislon P, Monteleone G, Prosini P P. Hydrogen production from solid sodium borohydride. Int J Hydrogen Energy 2009; 34.

[5] Liu B H, Li Z P, Suda S. Solid sodium borohydride as a hydrogen source for fuel cells. J Alloys Compd 2009; 468: 493-8.

[6] Andrieux J, Swierczynski D, Laversenne L, Garron A, Bennici S, Goutaudier C, et al. A multifactor study of catalyzed hydrolysis of solid NaBH$_4$ on cobalt nanoparticles: thermodynamics and kinetics. Int J Hydrogen Energy 2009: 34: 938-51.

[7] Ding X-L, Yuan X, Jia C, Ma Z-F. Hydrogen generaition from catalytic hydrolysis of sodium borohydride solution using cobaltecoppereboride (CoeCueB) Catalysts. Int J Hydrogen Energy 2010; 35:11077-84.

[8] Crisafulli C, Scire S, Salanitri M, Zito R, Calamia S. Hydrogen production through NaBH$_4$ hydrolysis over supported Ru catalysts: an insight on the effect of the support and the ruthenium precursor. Int J Hydrogen Energy 2011; 36: 3817-26.

[9] Muir S S, Yao X. Progress in sodium borohydride as a hydrogen storage material: development of hydrolysis catalysts and reaction systems. Int J Hydrogen Energy 2011; 36:5983-97.

[10] Zou Y C, Nie M, Huang Y M, Wang J Q, Liu H L. Kinetics of NaBH$_4$ hydrolysis on carbon-supported ruthenium catalysts. Int J Hydrogen Energy 2011; 36:12343-51.

[11] La C-t, Karan F K, Davis B R. Kinetic studies of reaction between sodium borohydride and methanol, water, and their mixtures. Ind Eng Chem Res 2007; 46:5478-84.

[12] Lo C-t, Karan F K, Davis B R. Kinetic assessment of catalysts for the methanolysis of sodium borohydride for hydrogen generation. Ind Eng Chem Res 2009; 48:5177-84.

[13] Hannauer J, Demirci U B, Pastor G, Geantet C, Herrmann J M, Miele P. Hydrogen release through catalyzed methanolysis of solid sodium borohydride. Energy Environ Sci 2010; 3: 1796-803.

[14] Brower F M, Matzek N E, Reigler P F, Rinn H W, Roberts C B, Schmidt D L, et al. Preparation and properties of aluminum hydride. J Am Chem Soc 1976; 98(9):2450-3.

[15] Graetz J, Reilly J J. Decomposition kinetics of the AlH$_3$ polymorphs. J Phys Chem B 2005; 109(47):22181-5.

[16] Zidan R. Aluminum hydride (Alane). In: Handbook of hydrogen storage: new materials for future energy storage. WILEY-VCH; 2010.

[17] Zidan R, Garcia-Diaz B L, Stowe A C, Gray J R, Harter A G. Aluminum hydride: a reversible material for hydrogen storage. Chem Commun 2009; 45:3717-9.

[18] Graetz J, Reilly J J. Thermodynamics of the a,b, and gpolymorphs of AlH$_3$. J Alloys Compd 2006; 424:262-5.

[19] Soler L, Macanas J, Munoz M, Casado J. Aluminum and aluminum alloys as sources of hydrogen for fuel cell applications. J Power Sources 2007; 169:144-9.

[20] Deng Z Y, Ferreira J M F. Physiochemical mechanism for the continuous reaction of g-Al$_2$O$_3$-modified aluminum powder with water. J Am Ceram Sac 2007; 99:1521-6.

[21] Soler L, Candela A M, Macanas J, Munoz M, Casado J. In situ generation of hydrogen from water by aluminum corrosion in solutions of sodium aluminate. J Power Sources 2009; 192: 21-6.
[22] Czech E, Troczynski T. Hydrogen generation through massive corrosion of deformed aluminum in water. Int J Hydrogen Energy; 2010:35.
[23] Wang E-D, Shi P-F, Du C-Y, Wang X-R. A mini-type hydrogen generator from aluminum for proton exchange membrane fuel cells. J Power Sources 2008; 181:144-8.
[24] Rosenband V, Gany A. Applications of activated aluminum powder for generation of hydrogen from water. Int J Hydrogen Energy 2010; 35:10898-904.
[25] Mahmoodi K, Alinejad B. Enhancement of hydrogen generation rate in reaction of aluminum with water. Int J Hydrogen Energy 2010; 35:5227-32.
[26] Jung C R, Kundu A, Ku B, Gil J H, Lee H R, Jang J H. Hydrogen from aluminum in a flow reactor for fuel cell applications. J Power Sources 2008; 175:490-4.
[27] Fan M-q, Sun L-x, Xu F. Feasibility study of hydrogen generation from the milled Al-based materials for micro fuel cell applications. Energy Fuels 2009; 23:4562-6.
[28] Eom K, Kim M, Oh M, Cho E, Kwon H. Design of ternary AleSneFe alloy for fast on-board hydrogen production, and its application to PEM fuel cell. Int J Hydrogen Energy 2011; 36:11825-31.
[29] Eom K, Cho E, Kwon H. Feasibility of on-board hydrogen production from hydrolysis of AleFe alloy for PEMFCs. Int J Hydrogen Energy 2011; 36:12338e42.
[30] Dupiano P, Stamatis D, Dreizin E L. Hydrogen production by reacting water with mechanically milled composite aluminum-metal oxide promoters. Int J Hydrogen Energy 2011; 36:4781-91.
[31] Deng Z Y, Tang Y B, Zhu L L, Sakka Y, Ye J. Effect of different modification agents on hydrogen-generation by the reaction of Al with water. Int J Hydrogen Energy 2010; 35:9561-8.
[32] Ziebarth J T, Woodall J M, Kramer R A, Choi G. Liquid phaseenabled reaction of AleGa and AleGaelneSn alloys with water. Int J Hydrogen Energy 011; 36:5271-9.
[33] Fan M-q, Sun L-X, Xu F, Mei D, Chen D, Chai W-x, et, al. Microstructure of AleLi alloy and its hydrolysis as portable hydrogen source for proton-exchange membrane fuel cells. Int J Hydrogen Energy 2011; 36:9791-8.
[34] El-Meligi A A. Hydrogen production by aluminum corrosion in hydrochloric acid and using inhibitors to control hydrogen evolution. Int J Hydrogen Energy 2011; 36:10600e7.
[35] Yoo H-S, Ryu H-Y, Cho S-S, Han M-H, Bae K-S, Lee J-H. Effect of Si content on H2 production using AleSi alloy powders. Int J Hydrogen Energy 2011; 36:15111-8.
[36] Huang X-n, Lv C-j, Huang Y-x, Liu S, Wang C, Chen D. Effects of amalgam on hydrogen generation by hydrolysis of aluminum with water. Int J Hydrogen Energy 2011; 36:15119-24.
[37] Liu S, Fan M-q, Wang C, Huang Y-x, Chen D, Bai L-q, et al. Hydrogen generation by hydrolysis of AleLieBieNaCl mixture with pure water. Int J Hydrogen Energy 2012; 37(1): 1014-20.
[38] Petrie M A, Bottaro J C, Schmitt R J, Penwell P E, Bomberger D C. Stabilized aluminum hydride polymorphs. 6,617,064, 2003.
[39] Lund G K, Hanks J M, Johnston H E. Method for the production of α-alane. 6,984,746, 2006.
[40] Zhu L, Swaminathan V, Gurau B, Masel R I, Shannon M A. An onboard hydrogen generation method based on hydrides and water recovery for micro-fuel cells. J Power Sources 2009; 192:556-61.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of generating hydrogen comprising the steps of:
providing a source of $AlH_3$;
heating the $AlH_3$ to a temperature of at least about 150°, thereby forming reaction products consisting of a fast hydrogen gas and activated aluminum; and,
adding a promoter to the activated aluminum reaction product, the promoter being selected from the group consisting of $NaAlH_4$, NaH, and NaOH to provide a composite material;
adding a stoichiometric amount of water to the composite material, thereby generating a second hydrogen gas source.

2. The process according to claim 1 wherein the step of adding a stoichiometric amount of water further provides increasing the amount of water to twice the stoichiometric amount.

3. The process according to claim 1 wherein step of heating the $AlH_3$ uses heat generated from a thermolysis of an $AlH_3$ containing composite material.

4. The process according to claim 1 wherein said step of adding a promoter to activated aluminum removes an oxide layer present of the surface of the activated aluminum.

5. The process according to claim 1 wherein the activated aluminum has a particle size and shape similar to the $AlH_3$ material but has a greater surface area following the heating step of $AlH_3$.

6. The process according to claim 1 wherein between about 3.3 weight % to about 3.6 weight % of hydrogen is released from the composite and water combination.

7. The process according to claim 1 wherein the composite material releases between about 10.0 weight % to about 10.6 weight % relative to the dry weight of the composite material.

8. The process according to claim 1 wherein said step of heating the AlH3 comprises heating the AlH3 to a temperature of between about 185° C. and about 200° C.

9. A process of providing hydrogen comprising the steps of:
providing a source of $AlH_3$;
adding a promoter to the $AlH_3$, the promoter selected from the group consisting of $NaAlH_4$, NaH, NaOH and combinations thereof to provide a composite material; and
adding water to the composite material, thereby generating a hydrogen gas reaction product without the addition of external heat.

10. The process according to claim 9 wherein the step of adding the promoter to the $AlH_3$ removes a polymeric coating on the surface of the $AlH_3$.

* * * * *